United States Patent [19]

Ingemarsson

[11] 4,158,627
[45] Jun. 19, 1979

[54] METHOD AND APPARATUS FOR EXTRACTING WASTE MATERIAL

[75] Inventor: Gosta I. Ingemarsson, Säffle, Sweden

[73] Assignee: AB Källe-Regulatorer, Sweden

[21] Appl. No.: 769,534

[22] Filed: Feb. 17, 1977

[30] Foreign Application Priority Data

Feb. 27, 1976 [CH] Switzerland .................... 7602658

[51] Int. Cl.² .................... C02C 3/00; B01D 33/04
[52] U.S. Cl. ........................ 210/49; 210/10; 210/81; 210/231; 210/67; 210/386; 210/396; 210/400
[58] Field of Search ................ 100/118–120, 100/151, 152; 210/10, 66–68, 73 S, 83, 241, 386, 396, 400, 401, 406, 79, 81, 231, 49

[56] References Cited

U.S. PATENT DOCUMENTS

| | | | |
|---|---|---|---|
| 1,958,279 | 5/1934 | Morgan | 100/152 |
| 3,381,609 | 5/1968 | Malarkey | 210/386 |
| 3,531,404 | 9/1970 | Goodman et al. | 210/10 |
| 3,601,039 | 8/1971 | Schover | 210/400 |
| 3,699,881 | 10/1972 | Levin et al. | 210/401 |
| 3,873,450 | 3/1975 | Lovegreen | 210/386 |
| 3,951,809 | 4/1976 | Kollmar | 210/400 |
| 3,998,149 | 12/1976 | Malarkey | 210/400 |

*Primary Examiner*—Charles N. Hart
*Assistant Examiner*—Peter A. Hruskoci
*Attorney, Agent, or Firm*—Ostrolenk, Faber, Gerb & Soffen

[57] ABSTRACT

Method and apparatus for drying waste matter such as sludge accumulated in a sewage treatment facility. The sludge is mixed with flocculating chemicals and thoroughly stirred. The mixture is then allowed to drain for a predetermined time in a porous-bottomed basin. A porous web preferably of braided wire which is movable across the basin floor carries the drained sludge to a pressing facility which squeezes the sludge between a pair of linear squeezing plates. As the web leaves the basin it is joined by a second web capturing the sludge therebetween for delivery to the pressing facility. The sludge may be air-blown in the pressing facility to achieve further dryness.

The common guiding roll about which the two webs merge also serves as an end wall for the aforementioned basin.

10 Claims, 1 Drawing Figure

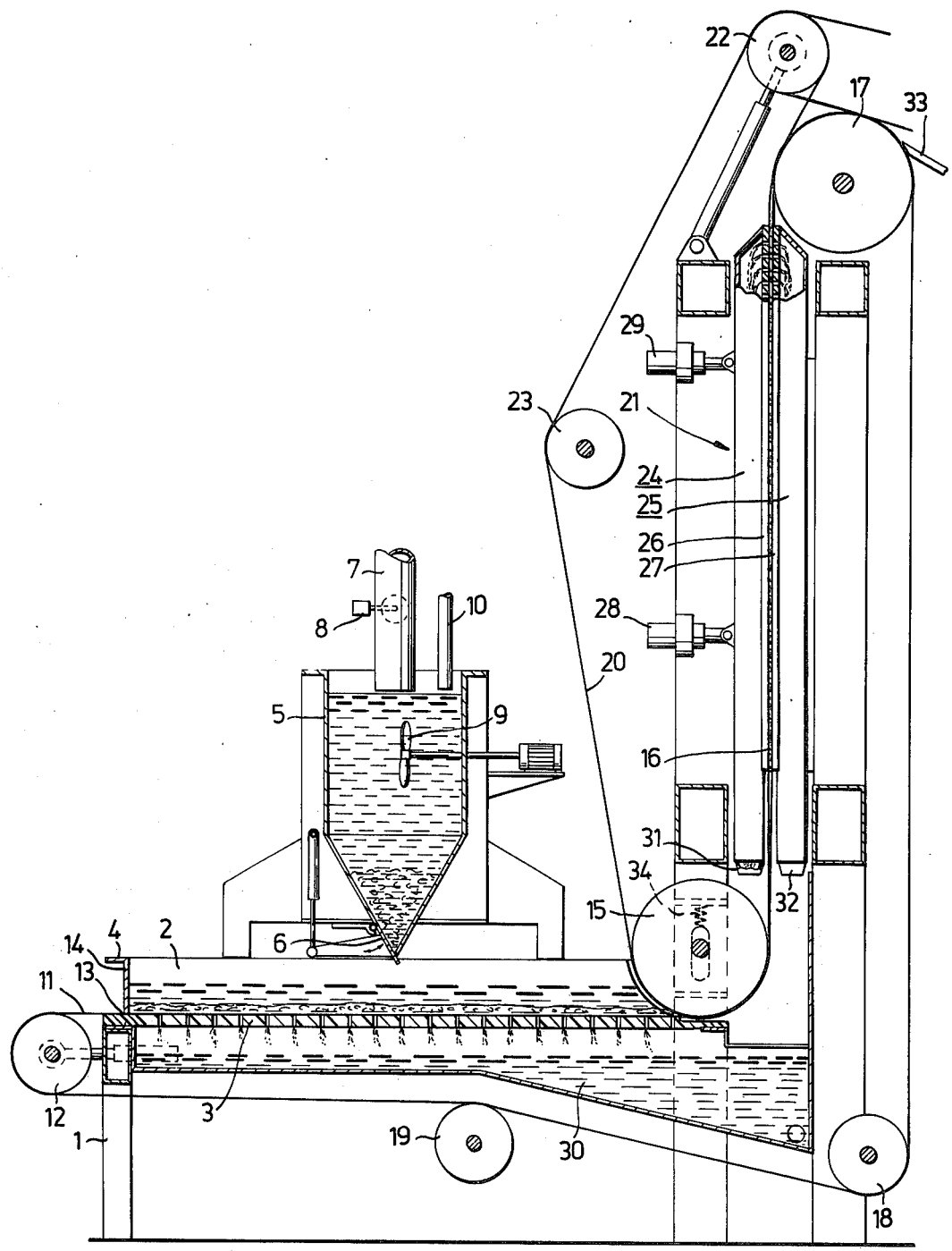

METHOD AND APPARATUS FOR EXTRACTING WASTE MATERIAL

BACKGROUND OF THE INVENTION

This invention relates to a method and apparatus for draining waste matter such as sludge, e.g. from communal wastewater treatment plants, by which method and device the sludge is compressed between two endless movable perforated bands, such as braided wire webs, partially bearing against each other in providing so high as degree of dryness of the sludge, that burning of the sludge will be possible.

Draining of sludge from communal wastewater treatment plants mainly takes place by aid of three different types of apparatus; namely centrifuges, band presses or filter presses. Since sludge normally contains large quantities of water, one has to drain it at the place of collection to avoid otherwise very expensive transportation costs. It is only the filter presses of the above mentioned apparatus which provide an acceptable dryness.

Said filter presses have however a drawback, that they are complicated as to their construction, which also means that they are not safe to operate and difficult and expensive to maintain. Thus the personal contribution in using filter presses is not of an acceptable order of greatness. To that must be added, that working near to such apparatus is not absolutely safe owing to the risk of infection.

Centrifuges are precision apparatus, which rotate with a very high angular speed. They are also very sensitive in that the load is kept on a constant level. In practice, this is not the case since sludge varies in mixture and in type over the course of time. This makes it difficult to control the centrifuge in obtaining an optimum result, and satisfactory results are not normally accomplishable in practice. To that must be added the problems resulting from sensitivity to external interferences and influences as well as maintenance requirements. The dryness levels attained in reality also lie on an unacceptable level of 15-20%.

Band presses of different types are usually relatively simple machines suitable to use in wastewater treatment plants. Therefore they have rapidly grown in acceptance and are now used in a widespread manner. Since compression normally takes place in nips formed between two rotating cylinders, high compression pressures necessarily have to be used since the compression times are relatively short or the number of compression nips are too great. If the compression pressure is increased over a certain value, the flocculations and great parts of the sludge pass out with the water through the wire. To that must be added the whole remoistening problem, in that an increase of the number of compression nips above a certain optimum number does not cause any additional improvement in dryness. The designers' experiments to surmount these problems have resulted in a variety of more or less complicated apparatus. Existing installations of apparatus in this field therefore have become more and more complicated and thus less adapted for its field of applications without obtaining improvements in dryness worth mentioning. The dryness is still in the range between 15-20%, depending on the type of sludge being processed.

BRIEF DESCRIPTION OF THE INVENTION

This invention provides a method and a device for draining sludge of the type described above, by which the above mentioned disadvantages are overcome. According to the invention the draining takes place in a discontinuous manner and in at least two discrete steps, in a first step a predetermined quantity of sludge is initially introduced into a container and while being stirred, extra flocculating chemicals are added to the container. The sludge is then emptied from the container into a basin over the perforated bottom of which the upper part of the braided wire web is guided. As a second step the sludge deposited on the web is drained with or without pressure to a dryness suitable for compression, whereupon the braided wire having the deposited sludge thereupon is fed into a flat plate pressing nip, in which the sludge in a third step is compressed to a desired dryness.

The device for performing the method according to the invention comprises a container for receiving a predetermined quantity of sludge, in which container stirring means are provided; a basin having a perforated bottom over which the sludge tapped into the container is intended to be emptied, the upper part of an endless, perforated band, for instance a braided wire web, is guided over the basin floor, said web covering the entire area of the floor and at least one subsequent flat plate pressing nip having a pressing-length and -width substantially corresponding to the length and width of the basin bottom.

By use of a discontinuous flat plate pressing method, the existing disadvantages with band presses are eliminated, and the disadvantages arising from the operation- and maintenance point of view disappear. The compressing time and compressing pressure can be varied independently of the dewatering process by choice of pressing length and the number of pressing steps provided in the final construction. The method of step-by-step operation also makes it possible to provide draining operations during the periods between steps. The volume of the apparatus is also used more economically in that almost the entire length of the wire contacting the thickened sludge cake is exposed to the compressing pressure. Owing to the fact that the dewatering processes are slow, the discontinuous feeding of the cake of sludge is not a disadvantage. An essential advantage of the discontinuous feeding technique is that essentially smaller amounts of flocculating chemicals are consumed than would otherwise be the case in continuous dewatering processes. Thus one obtains as a final result a cake of sludge having a dryness of 30%, without the complicated and potentially dangerous handling operations which are necessary in filter presses, for example.

BRIEF DESCRIPTION OF THE FIGURES

The invention will now be described by way of example only with particular reference to the accompanying drawing, which shows a side elevational view of a draining device according to the invention.

DETAILED DESCRIPTION OF THE INVENTION

As principally can be seen from the drawing, the present invention relates to a method for draining waste matter, such as sludge, said sludge in a first step being poured into a container in a predetermined quantity and being stirred while adding extra flocculating chemicals to the container. The sludge is then emptied during a second step into a draining basin, where the dryness of the sludge is increased from 6% up to a level which is suitable for compression and after that, in a third step, the sludge is enclosed between two wire braids to be fed into a flat plate press for compression to a dryness at which the sludge can be most economically transported or can be destroyed by burning.

A suitable device for performing the method according to the invention is illustrated in detail in the drawing. Said device comprises a framework or frame 1, which supports a basin 2, the floor 3 of which consists of a perforated plate. The edge 4 of the basin 2 supports a container 5, situated above the basin 2, the lower part of said container 5 being provided with a tapping opening 6. In the upper part of the container 5, a conduit 7 opens for the sludge to be dewatered. A cutoff valve 8 is situated near the delivery end of the conduit 7. Stirring means 9 are provided in the container 5 for stirring the sludge, said means 9 being used for effective mixing of the sludge with extra flocculating chemicals, e.g. polyelectrolytes, portioned from a conduit 10. The stirring rate can be varied so that the mixing becomes violent in the beginning and less violent later on when the flocks begin to be formed and can get damaged. The upper part of an endless, movable, perforated band 11, for instance a porous braided wire web, extends over the perforated bottom 3, and is entrained around and runs over a drawing roll 12, which is adjustably fixed to one end of the frame 1. The web 11 extends through a substantially water-tight slot 13 in the end wall 14 of the basin 2 and runs around an endroll 15 serving as the opposite endwall of the basin 2 and runs thereafter vertically upwards through a flat plate pressing nip 16 to a driving roll 17 around which the web turns through an angle of 180°, so that the web again extends in a vertical direction, eventually through a second flat plate pressing nip, up to a leading roll 18, situated in the lower part of the frame 1, from which roll 18 the web 11 extends substantially horizontally over a straightening roller 19 up to the first mentioned drawing roll 12.

A second endless, movable, perforated band or web 20, also in the form of a braided wire, runs around the end roll 15.

The web 20 extends in a direction downwards into the basin 2 and bears against the exterior surface of the end roll 15 turning through an angle of approximately 180°, so that the web 20 first contacts the sludge alone before said web at its lowermost position or end position and is pressed by the end roll 15 in a direction towards the bottom 3 of the basin 2 and the first web 11, which is fed thereupon. After the contact point against the bottom 3, the sludge is captured between the wire braids 11 and 20 and is moved in a vertical direction into a flat plate press 21. The wire braid 20, which directly bears against the end of roll 15, extends as mentioned above vertically upwards through the flat plate press 21 to the driving roll 17 serving as a breaking or turning roll for the first web 11, but only as a driving roll for the second web 20. The braid 20 does not bear directly against the driving roll 17, but has the sludge and the first web 11 between itself and the exterior surface of the driving roll 17. From the driving roll 17, against which the wire braid 20 extends inclined upwards to a drawing roll 22, the wire braid 20 bears against 180° of the peripheral surface of roll 22 and along straightening roller 23 whereby the web returns to the end roll 15.

The web 11 thus defines a generally L-shaped path in moving from basin 2 to the press 21 and in returning from the scraper 33 to the point of entry into basin 2. Although the web is shown as moving vertically upward after leaving basin 2, it may be arranged to move vertically downward. As a still further alternative, web 11 may move horizontally out of basin 2 and thus enter between a horizontally aligned press.

Obviously, the web 20 which moves along a generally elongated oval-shaped path, would be positioned to cooperate with the alignment of web 11 in moving the sludge to the press, and may even be eliminated in the latter most embodiment referred to hereinabove.

The flat plate pressing nip 16, whose length is at least equal to the length of the floor of basin 3 over which the first web 11 extends, is arranged between the end roll 15 and driving roll 17 and surrounds the wire braids 20 and 11, which extend in a vertical direction between these rolls. The flat plate pressing nip 16 is formed of two press boxes 24 and 25, movable in a direction towards and away from each other, the compressing surfaces of which consist of perforated plates 26 and 27. Two hydraulic cylinders 28 and 29 act against press box 24, which is movable, in order to provide a desired compression pressure between the plates 26 and 27. This pressure is less than 10 kp/cm$^2$ and lies normally on a value of about 1 kg/cm$^2$. It is also possible to arrange additional flat plate presses on a linear manner each after the other, but under normal conditions one flat plate press is sufficient for most applications.

The water removed from the sludge is taken away by a collecting tank 30, which extends under the perforated bottom 3 and at that part of the tank 30 which is below the flat plate press 21 receives the water which passes through press boxes 24 and 25 via conduits 31 and 32.

Means, such as a scraper 33, acts against the driving roll 17 in order to remove the finished pressed sludge cake from the wire braid 11. cleaning means for cleaning the braided wire 20 can be provided between the drawing roll 22 and the roll 15 and similar cleaning means can also be provided between the drawing roll 12 and the leading roll 18 for cleaning the first braided wire 11.

The end roll 15 is spring-actuated against the bottom 3 of the basin 2 by a screw spring 34 in taking up foreign, greater objects, which have entered the draining device together with the sludge. The draining device according to the present invention functions as follows:

Sludge is tapped into the container 5. When the container 5 is filled or has been filled, extra flocculating chemicals are added during simultaneous stirring to provide as great a separation as possible of the chemicals and thus a perfect flocculation of the sludge. The sludge is then emptied into the basin 2 having the perforated bottom 3, and upon the web 11, in which the dryness of the sludge is increased from 1–6% to a level which is suitable for compression. After a while, the web 11 begins to move, so that the web 11 and the sludge deposited thereon is fed under the end roll 15 at the same time as the second web 20 comes into contact with the upper side of the sludge. After the webs 11 and 20 enclosing the sludge have left the end roll 15, they are fed in an upward vertical direction into the flat plate pressing nip 16. When the total length of the webs enclosing sludge i.e. of the same length as the basin bottom, has been fed between the plates of the flat plate press 21, the webs stop and the compressing process is started. Normally the compressing time is 30-60 secs and the compressing pressure 1 kp/cm$^2$. At the same time as the compression takes place, a further quantity of sludge is delivered to the basin 2 for draining and immediately after the container 5 is emptied the tapping opening 6 is closed, so that the container 5 can be filled again. Alternatively effectiveness of the compressing cycle can be enhanced by blowing air through the sludge in removing the remaining water if any, whereby air is blown from the press box 24 through the sludge to the other press box 25, in which box 25 the removed water is collected and taken away by the conduit 32.

At the end of the compressing interval the sludge cake is fed out from the press over the driving roll 17, from which the sludge cake is removed from the second braided wire web 11. Any remaining sludge on web 20 may be removed by means of the scraper 33, and after that, for instance via a conveyor, the sludge may be carried away to any suitable collecting vessel.

What is claimed is:

1. A method for treating sludge as part of wastewater treatment comprising discrete and noncontinuing steps of:

adding flocculating agents to a quantity of sludge and stirring the mixture;

feeding the stirred mixture into a basin having a perforated bottom and upon a first perforated web to allow water to drain therefrom;

moving the web and hence the residue deposited thereon to a location out of said basin having a pair of linear plates; and pressing the plates together to squeeze water from the residue between said plates, said method further comprising the steps of passing the first web with the residue deposited thereon around a roll and covering the surface of the residue with a second perforated web moving with the first web to support the residue between the webs as they pass in a vertical direction between said plates.

2. The method of claim 1 wherein the first web is moved horizontally along the basin floor and through a 90° turn around said roll to move vertically upward and between said plates.

3. The method of claim 2 wherein air is blown through the residue between the webs after the pressing operation.

4. The method of claim 2 further comprising the step of separating the webs and removing the residue therefrom.

5. The method of claim 4 wherein the residue is removed by placing a scraper against the web carrying the residue after the webs have separated.

6. Apparatus for draining sludge comprising a basin having a perforated bottom;

a closed loop perforated web and first guiding means including a plurality of rolls for guiding the web around an L-shaped loop;

one horizontal path portion of the L-shaped loop extending across the floor of said basin;

a common pressing roll positioned at one end of the basin for guiding the web through a turn to move along a path portion generally in the vertical direction;

a second closed loop perforated web;

second guiding means including a second plurality of rolls cooperating with said pressing roll to guide the second web about a predetermined path having one linear portion extending generally parallel to the vertical path portion of the first web;

a pair of plates positioned on opposite sides of the vertical path portion adapted to squeeze the webs together when said plates are pressed together, and means to press said plates together.

7. The apparatus of claim 6 wherein one of said plates is stationary and the other of said plates is movable.

8. Apparatus for draining water from sludge comprising:

a first closed loop perforated web and first guiding means including at least first and second end rolls for moving the first web about a loop;

a basin for receiving sludge having a perforated floor;

a portion of one run of said loop extending through the basin and across the floor thereof and the remaining portion of said one run extending beyond one end of the basin;

a second closed loop perforated web and second guiding means including first and second end rolls for guiding the second web, one run of the second web lying adjacent to the said remaining portion of the first web to hold said sludge deposited on the first web and moved out of the basin between the first and second webs;

a pair of linear squeezing plates positioned on opposite sides of the remaining path portion and movable together to squeeze the webs and their contents therebetween.

9. The apparatus of claim 8 wherein said second guiding means first end roll is common to said first guiding means and is positioned at one end of the basin and serving as an end wall for the basin by allowing the first web to pass between the roll and the basin floor while substantially restraining the flow of fluid out of said one end.

10. The apparatus of claim 9 wherein one of said plates is stationary and the other of said plates is movable.

* * * * *